Patented June 13, 1939

2,161,928

UNITED STATES PATENT OFFICE 2,161,928

HYDANTOINS CONTAINING THE STEROL NUCLEUS

Karl Miescher, Riehen, and Albert Wettstein, Basel, Switzerland, assignors to the firm of Society of Chemical Industry in Basle, Basel, Switzerland No Drawing. Application December 7, 1937, Serial No. 178,615. In Switzerland December 24, 1936

7 Claims. (Cl. 260—309)

We have found that cyclic ketones containing the sterol nucleus lack reactivity, for example they cannot be condensed to hydantoins with cyanides and ammonium carbonate under the conditions usual for such reactions.

This invention is based on the observation that hydantoins containing the sterol nucleus are produced if energetic conditions of reaction are used, namely if in presence of a solvent the cyclic ketone containing the sterol nucleus is treated simultaneously with a cyanide and ammonium carbonate or ammonia and carbon dioxide under pressure and at a temperature above 100° C. By maintaining especially energetic conditions of reaction there is produced a secondary reaction to the formation of hydantoin, for example a saponification of ester groups.

As parent materials there may be used, for example androsterone, trans-dehydro-androsterone, androstene-dione-(3,17), 3-oxy-etiocholanone-(17), testosterone, androstanol-(17)-one-(3), cholestanone, progesterone, oestrone, equilenin, compounds of the suprarenal cortical hormone series, the stereo-isomerides and homologues or esters and ethers of the above bodies, also partial enol derivatives or other derivatives having unchanged carbonyl groups or the like.

Suitable solvents are, for instance, water, organic solvents or mixtures thereof.

The hydantoins produced are derived from the spirans, that is to say they contain a carbon atom which is concerned with all four valences in the formation of two rings. The products of the process are characterized, as compared with the parent materials, by their relatively sparing solubility in organic solvents, and are thus easily isolated. They are important intermediate products in the manufacture of valuable therapeutic compounds.

The following examples illustrate the invention, the parts being by weight:

Example 1

2.9 parts of trans-dehydro-androsterone, 3.4 parts of ammonium carbonate, 2 parts of potassium cyanide and 100 parts of alcohol of 70 per cent. strength are together heated at about 135° C. for 18 hours in an autoclave in an atmosphere of carbon dioxide at 25 atms. pressure. 700 parts of water are added to the mixture and the whole is cautiously acidified with concentrated hydrochloric acid, then filtered and the solid matter washed with water and dried in a vacuum. This product is extracted three times with 30 parts each of boiling methanol. The insoluble portion is colorless, beautifully crystallized, $\Delta^{5,6}$-3-oxy-etiocholene-17-spiro-hydantoin of the formula

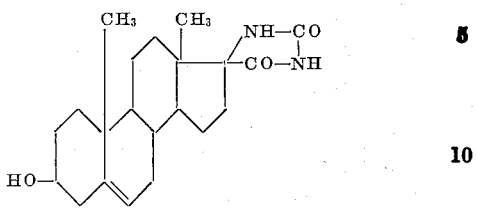

It is sparingly soluble in organic solvents and may be recrystallized from glacial acetic acid with addition of a little water. It is obtained analytically pure and decomposes at a temperature above 365° C.

When starting for example from androstenedione-(3,17), the corresponding 3,17-di-spirohydantoin is obtained in similar manner.

Example 2

3.3 parts of trans-dehydro-androsterone-acetate, 3.4 parts of ammonium carbonate, 2 parts of potassium cyanide and 100 parts of alcohol of 65 per cent. strength are together heated at 120° C. in an autoclave for 15 hours in an atmosphere of carbon dioxide at 20 atms. pressure. There are then added 600 parts of water, the whole is acidified and filtered, the solid matter being washed with water and dried in a vacuum. For removing unchanged parent material the product is extracted with hot petroleum ether. The insoluble portion is crystallized from much methyl alcohol and there is thus obtained pure $\Delta^{5,6}$-3-acetoxy-etiocholene-17-spiro-hydantoin of the formula

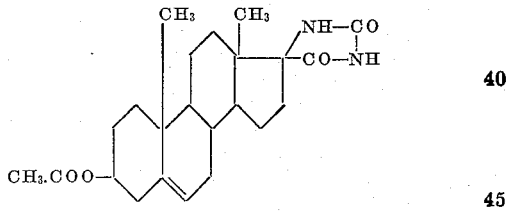

which melts with decomposition at 311° C.

Instead of the acetate of trans-dehydroandrosterone other esters, ethers or halogen compounds may be used and corresponding hydantoins obtained.

Example 3

3.3 parts of trans-dehydro-androsterone-acetate, 3.4 parts of ammonium carbonate, 2 parts of potassium cyanide and 100 parts of alcohol of 70 per cent. strength are together heated at 150° C. for 24 hours in an autoclave in an atmosphere of carbon dioxide at 25 atms. pressure. The mixture is worked up as described in Example 1, and while the acetyl group in 3-position is saponified there is obtained the $\Delta^{5,6}$-3-oxy-etiocholene-17-spirohydantoin.

As parent material there may also be used testosterone, dihydrotestosterone or their esters and there are thus obtained corresponding 3-spiro-hydantoins, having in the 17-position a hydroxyl or an acyloxy, such as for instance acetoxy group.

*Example 4*

2.9 parts of androsterone are caused to react under the conditions described in Example 1 with ammonium carbonate and potassium cyanide, whereby the 3-epi-oxy-etio-allo-cholane-17-spiro-hydantoin of the formula

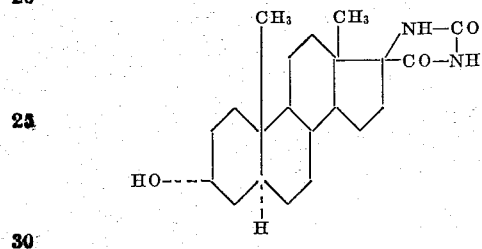

is obtained.

What we claim is:

1. The cyclopentano-polyhydrophenanthrenes which are substituted with spiro-hydantoin in a position selected from the group consisting of the 3-, 17- and 3:17- positions.

2. The hydroxy-cyclopentano-polyhydro-10, 13-dimethyl-phenanthrenes which are substituted with a spiro-hydantoin in a position selected from the group consisting of the 3- and 17- positions.

3. The 3-hydroxy-cyclopentano-polyhydro-10, 13-dimethyl-phenanthrene-17-spiro-hydantoins.

4. The $\Delta^{5,6}$-3-hydroxy-etiocholene-17-spiro-hydantoin of the formula

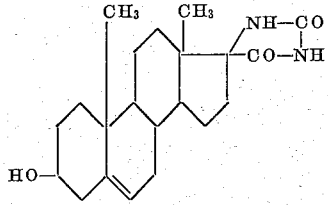

5. The 17-hydroxy-cyclopentano-polyhydro-10, 13-dimethyl-phenanthrene-3-spiro-hydantoins.

6. The 3-acyloxy-cyclopentano-polyhydro-10, 13-dimethyl-phenanthrene-17-spiro-hydantoins.

7. The acyloxy-cyclopentano-polyhydro-10,13-dimethyl-phenanthrenes which are substituted with a spiro-hydantoin in a position selected from the group consisting of the 3- and 17-positions.

KARL MIESCHER.
ALBERT WETTSTEIN.